US012735767B2

(12) United States Patent
Nishikawa et al.

(10) Patent No.: US 12,735,767 B2
(45) **Date of Patent: *Sep. 15, 2026**

(54) METHOD FOR RECOVERING VALUABLE SUBSTANCE

(71) Applicant: DOWA ECO-SYSTEM CO., LTD., Tokyo (JP)

(72) Inventors: Chihiro Nishikawa, Tokyo (JP); Yoshihiro Honma, Tokyo (JP); Ryoei Watanabe, Tokyo (JP); Masataka Yamashita, Tokyo (JP); Youichi Fukuchi, Tokyo (JP); Tomotaka Izumi, Tokyo (JP); Yoshiki Ito, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 651 days.

This patent is subject to a terminal disclaimer.

(21) Appl. No.: 18/025,485

(22) PCT Filed: Sep. 7, 2021

(86) PCT No.: PCT/JP2021/032875

§ 371 (c)(1), (2) Date: Mar. 9, 2023

(87) PCT Pub. No.: WO2022/059563

PCT Pub. Date: Mar. 24, 2022

(65) Prior Publication Data

US 2023/0323506 A1 Oct. 12, 2023

(30) Foreign Application Priority Data

Sep. 15, 2020 (JP) ................................. 2020-154515

(51) Int. Cl.

*C22B 9/22* (2006.01)
*C22B 7/00* (2006.01)

(Continued)

(52) U.S. Cl.

CPC ................ *C22B 9/22* (2013.01); *C22B 7/001* (2013.01); *C22B 15/0056* (2013.01);

(Continued)

(58) Field of Classification Search

CPC ....... C22B 9/22; C22B 7/001; C22B 15/0056; C22B 15/0095; C22B 21/0092; H01M 10/54; Y02P 10/20; Y02W 30/84

See application file for complete search history.

(56) References Cited

U.S. PATENT DOCUMENTS 1,628,273 A 5/1927 Richardson
7,328,697 B2 2/2008 Turner et al.

(Continued)

FOREIGN PATENT DOCUMENTS

CN 102583310 7/2012
CN 107532231 1/2018

(Continued)

OTHER PUBLICATIONS

JP 2019-034254 A machine translation (Year: 2019).*

(Continued)

*Primary Examiner* — Tima M. McGuthry-Banks

(74) *Attorney, Agent, or Firm* — Greenblum & Bernstein, P.L.C.

(57) ABSTRACT

A method for recovering a valuable substance is provided. The method includes a thermal treatment step of thermally treating a target, which contains a valuable substance and is stored in a target storing unit, via a flame blocking unit configured to block a flame for thermally treating the target such that the target storing unit is not contacted by the flame, and a valuable substance recovering step of recovering the valuable substance from a thermally treated product of the target obtained in the thermal treatment step.

13 Claims, 2 Drawing Sheets

(51) Int. Cl.
*C22B 15/00* (2006.01)
*C22B 21/00* (2006.01)
*H01M 10/54* (2006.01)

(52) U.S. Cl.
CPC ...... *C22B 15/0095* (2013.01); *C22B 21/0092* (2013.01); *H01M 10/54* (2013.01); *Y02P 10/20* (2015.11); *Y02W 30/84* (2015.05)

(56) References Cited

U.S. PATENT DOCUMENTS

| | | | | |
|---|---|---|---|---|
| 8,157,887 | B2 | 4/2012 | Frame | |
| 2006/0246391 | A1 | 11/2006 | Gaur et al. | |
| 2009/0314134 | A1 | 12/2009 | Iida | |
| 2012/0024111 | A1 | 2/2012 | Bratina et al. | |
| 2018/0083325 | A1 | 3/2018 | Usui et al. | |
| 2019/0386354 | A1* | 12/2019 | Muraoka | H01M 10/54 |
| 2020/0136201 | A1 | 4/2020 | Usui et al. | |
| 2023/0318063 | A1 | 10/2023 | Suganuma | |
| 2023/0366061 | A1 | 11/2023 | Nishikawa | |

FOREIGN PATENT DOCUMENTS

| | | | |
|---|---|---|---|
| JP | 08217401 | 8/1996 | |
| JP | 2010-003512 | 1/2010 | |
| JP | 2011-117270 | 6/2011 | |
| JP | 2013-064177 | 4/2013 | |
| JP | 2015-170480 | 9/2015 | |
| JP | 2016-022395 | 2/2016 | |
| JP | 2016-207648 | 12/2016 | |
| JP | 2016-219402 | 12/2016 | |
| JP | 6268130 | 1/2018 | |
| JP | 2018-159477 | 10/2018 | |
| JP | 2019-175546 | 10/2019 | |
| JP | 2020-049459 | 4/2020 | |
| JP | 2020-049460 | 4/2020 | |
| JP | 2020-64855 | 4/2020 | |
| JP | 7017860 | 2/2022 | |
| WO | WO-9531012 A1 * | 11/1995 | H01M 10/613 |

OTHER PUBLICATIONS

JP 2019-175546 A English translation (Year: 2019).*
Nave, C. R. Magnetic Properties of Ferromagnetic Materials. HyperPhysics. 8 pages. https://hyperphysics.phy-astr.gsu.edu/hbase/hframe.html (Year: 2017).*
Schwartz, Harold. Nickel. ProKon. (Year: 1998).*
Australian Stainless Steel Development Association. Stainless Steel and Fire Resistance. Updated May 16, 2023. 7 pages. https://www.assda.asn.au/blog/307-stainless-steel-and-fire-resistance (Year: 2019).*
Supplementary European Search Report issued in European Patent Application No. 21869250.7, dated Mar. 15, 2024.
Chinese Official Action issued in CN Application No. 202180062238.5, dated Apr. 18, 2024.
Office Action issued in Japan Counterpart Patent Appl. No. 2020-154515, dated Oct. 26, 2021.
Preliminary Report on Patentability issued in International Bureau of WIPO Patent Application No. PCT/JP2021/032875, dated Nov. 2, 2021.
International Search Report issued in International Bureau of WIPO Patent Application No. PCT/JP2021/032875, dated Nov. 2, 2021.
Singapore Office Action issued in Singapore Patent Application No. 11202301809V, dated Jun. 30, 2025.
Zhou, et al., "The Current Process for the Recycling of Spent Lithium Ion Batteries," Frontiers in Chemistry, vol. 8, Dec. 3, 2020.
Office Action issued in Singapore Application No. 11202301693P, dated Jul. 2, 2025.
International Search Report issued in International Bureau of WIPO Patent Application No. PCT/JP2021/032876, dated Oct. 19, 2021, and English translation.
Notice of Reasons for Revocation (Opposition) issued in Japanese Patent Appl. No. 6965420, dated Jul. 27, 2022, (Opposition No. 2022-700376).
Supplementary European Search Report issued in EP 21869251.5, dated Feb. 12, 2024.
Chinese Office Action issued in Chinese patent application No. 202180062380.X, dated Apr. 1, 2025.
U.S. Office Action issued in U.S. Appl. No. 18/024,825, dated Jun. 16, 2025.
International Search Report issued in International Patent Application No. PCT/JP2021/032511, dated Nov. 9, 2021, along with an English translation thereof.
Written Opinion of the International Searching Authority for International Patent Application No. PCT/JP2021/032511, dated Nov. 9, 2021, along with an English translation thereof.
Office Action issued in Japanese Patent Appl. No. 2021-553828, dated Nov. 16, 2021, along with an English translation thereof.
Office Action issued in Japanese Patent Appl. No. 2021-553828, dated Feb. 8, 2022, along with an English translation thereof.
Notice of Reasons for Refusal (Appeal) in Japanese Patent Appl. No. 2021-553828 (Appeal No. 2022-6478), dated Jul. 5, 2022, along with an English translation thereof.
Supplementary European Search Report issued in EP 21866682.4, dated Mar. 28, 2024.
Requesting Reconsideration) Office Action issued in Taiwan Counterpart Patent Appl. No. 110133513, dated Jul. 21, 2022, along with English translation thereof.
Requesting Reconsideration) Office Action issued in Taiwan Counterpart Patent Appl. No. 110133513, dated Oct. 26, 2022, along with English translation thereof.
U.S. Office Action issued in U.S. Appl. No. 18/025,490, dated Nov. 20, 2025.
U.S. Office Action issued in U.S. Appl. No. 18/024,825, dated Dec. 4, 2025.

* cited by examiner

METHOD FOR RECOVERING VALUABLE SUBSTANCE

TECHNICAL FIELD

The present invention relates to a method for recovering a valuable substance.

BACKGROUND ART

Lithium ion secondary batteries have a lighter weight, a higher capacity, and a higher electromotive force than those of existing lead-acid batteries and NiCd secondary batteries, and are used as secondary batteries of, for example, personal computers, electric vehicles, and portable devices. For example, valuable substances such as cobalt and nickel are used in the positive electrodes of lithium ion secondary batteries in the form of, for example, lithium cobaltate ($LiCoO_2$) and a ternary system positive electrode material ($LiNi_xCo_yMn_zO_2$ (x+y+z=1)).

Lithium ion secondary batteries are expected to continue to become more widespread in use. Therefore, in terms of resource recycling, it is desirable to recover valuable substances such as lithium and copper from defective products generated in the production process or from lithium ion secondary batteries discarded due to, for example, expired life of the batteries and of the devices in which they are used. Here, processes for lithium ion secondary batteries for recovering valuable substances from them may include a thermal treatment for deactivating the lithium ion secondary batteries and rendering them harmless. In order to increase the value of valuable substances to be recovered, it is important to recover the valuable substances without inducing oxidization (embrittlement) of various metals to be contained in thermally treated products to be obtained by thermally treating the lithium ion secondary batteries.

A method for processing lithium ion batteries by heating, which is proposed as a method for thermally treating lithium ion secondary batteries while inhibiting embrittlement of various metals contained in the lithium ion secondary batteries is as follows. In order to heat lithium ion batteries in a combustion furnace for combusting combustion targets by flames while inhibiting the housings of the lithium ion batteries from being directly contacted by the flames, this method involves placing the lithium ion batteries in a battery protection container that inhibits the housings of the lithium ion batteries from being directly contacted by the flames in the combustion furnace, and bringing the flames into contact with the external surface of the battery protection container, to thereby process the lithium ion batteries by heating (for example, see PTL 1).

However, existing techniques of this type have a problem that the battery protection container may become, for example, deformed or broken.

CITATION LIST

Patent Literature

PTL 1: Japanese Patent Application Laid-Open (JP-A) No. 2016-207648

SUMMARY OF INVENTION

Technical Problem

As described above, according to the existing techniques that heat lithium ion secondary batteries by bringing flames into contact with the external surface of the battery protection container that protects the lithium ion secondary batteries, the battery protection container may deteriorate due to the direct contact by the flames, and may be deformed or broken. Hence, the existing techniques may involve a lot of costs on production, replacement, and repair of the battery protection containers.

Moreover, according to the existing techniques described above, when the battery protection container has become deformed or broken by deterioration, there may be a case where excessive heat is applied to the lithium ion secondary batteries inside the battery protection container, valuable substances such as copper to be recovered from the lithium ion secondary batteries may be oxidized or embrittled, and the recovery rates and the grades of the valuable substances recovered may be low.

The present invention aims for solving the various problems in the related art and achieving an object described below. That is, an object of the present invention is to provide a method for recovering a valuable substance, the method being able to inhibit deterioration of a target storing unit, in which a target containing a valuable substance is stored, and to recover the valuable substance at a high recovery rate at a high grade.

Solution to Problem

Means for solving the above problems are as follows.

<1> A method for recovering a valuable substance, the method including:
- a thermal treatment step of thermally treating a target, which contains a valuable substance and is stored in a target storing unit, via a flame blocking unit configured to block a flame for thermally treating the target such that the target storing unit is not contacted by the flame; and
- a valuable substance recovering step of recovering the valuable substance from a thermally treated product of the target obtained in the thermal treatment step.

<2> The method for recovering a valuable substance according to <1>,
- wherein in the thermal treatment step, the target is thermally treated while the flame blocking unit is provided between the target storing unit and a flame radiating unit configured to radiate the flame.

<3> The method for recovering a valuable substance according to <1> or <2>,
- wherein the flame blocking unit is formed of stainless steel.

<4> The method for recovering a valuable substance according to any one of <1> to <3>,
- wherein an average thickness of a region of the flame blocking unit contacted by the flame is 3 mm or greater.

<5> The method for recovering a valuable substance according to any one of <1> to <4>,
- wherein the flame blocking unit has a plate shape.

<6> The method for recovering a valuable substance according to any one of <1> to <5>,
- wherein the target storing unit is formed of iron or stainless steel.

<7> The method for recovering a valuable substance according to any one of <1> to <6>,
- wherein in the thermal treatment step, the target is thermally treated at 750° C. or higher and lower than 1,085° C.

<8> The method for recovering a valuable substance according to any one of <1> to <7>, wherein the target is a lithium ion secondary battery.

<9> The method for recovering a valuable substance according to <8>, wherein the lithium ion secondary battery has a housing containing aluminum, and in the thermal treatment step, the aluminum of the housing of the lithium ion secondary battery is melted and a melted product is separated.

<10> The method for recovering a valuable substance according to <8> or <9>, wherein the valuable substance contains copper.

<11> The method for recovering a valuable substance according to any one of <8> to <10>, wherein in the thermal treatment step, a combustion state of the lithium ion secondary battery is observed to judge whether combustion of the lithium ion secondary battery has finished or not, and when it is judged that combustion of the lithium ion secondary battery has finished, the thermally treating is terminated.

<12> The method for recovering a valuable substance according to any one of <1> to <11>, wherein the valuable substance recovering step includes:

a pulverizing step of pulverizing the thermally treated product, to obtain a pulverized product;

a classifying step of classifying the pulverized product at a classification point of 0.6 mm or greater and 2.4 mm or less, to obtain a coarse-grained product and a fine-grained product; and a magnetic force sorting step of sorting the coarse-grained product using a magnet having a magnetic flux density of 0.03 tesla or higher.

Advantageous Effects of Invention

According to the present invention, it is possible to solve the various problems in the related art and provide a method for recovering a valuable substance, the method being able to inhibit deterioration of a target storing unit, in which a target containing a valuable substance is stored, and to recover the valuable substance at a high recovery rate at a high grade.

Figure 1A:
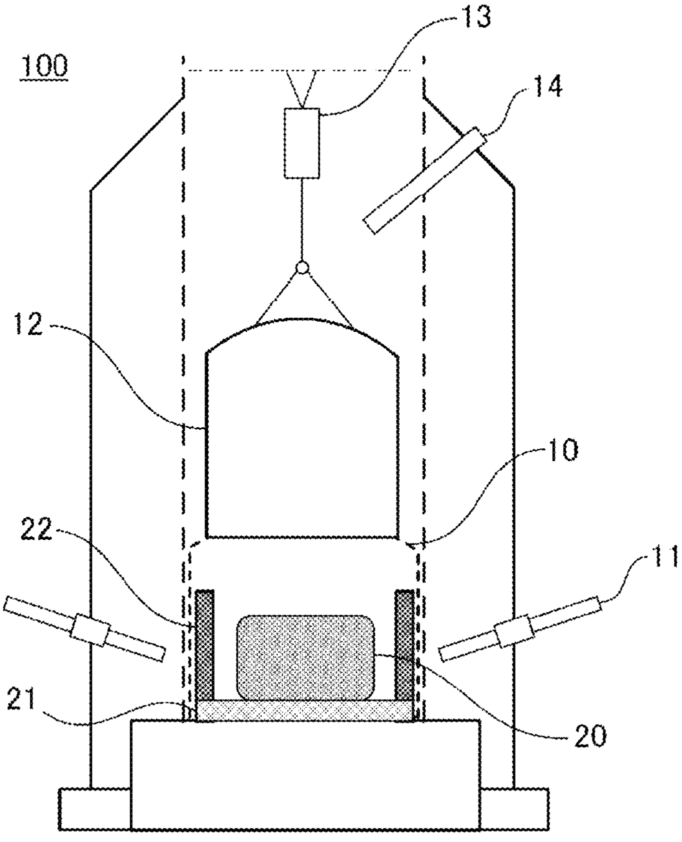
FIG. 1A is a concept diagram illustrating an example cylindrical fixed bed furnace that can be used in a method for recovering a valuable substance of the present invention.

DESCRIPTION OF EMBODIMENTS (Method for Recovering a Valuable Substance)

A method for recovering a valuable substance of the present invention includes a thermal treatment step and a valuable substance recovering step, and further includes other steps as needed. The valuable substance recovering step of the method for recovering a valuable substance of the present invention preferably includes a pulverizing step, a classifying step, and a magnetic force sorting step, and further includes other steps as needed.

The method for recovering a valuable substance of the present invention is based on the present inventors' following finding. According to the existing techniques, when thermally treating targets such as lithium ion secondary batteries (LIB) to recover valuable substances such as copper, there may be a case where a target storing unit such as a container in which the targets are stored deteriorates, and there may also be a case where the grades and the recovery rates of the valuable substances recovered are not sufficient.

More specifically, as described above, because the existing techniques thermally treat lithium ion secondary batteries by bringing flames into direct contact with the battery protection container that protects the lithium ion secondary batteries, the battery protection container may deteriorate, and may be deformed or broken. Hence, the existing techniques may involve a lot of costs on production, replacement, and repair of the battery protection containers. Moreover, when the battery protection container has deformed or broken by deterioration, valuable substances such as copper to be recovered from the lithium ion secondary batteries may be oxidized or embrittled, and the recovery rates and the grades of the valuable substances recovered may be low.

As described, the present inventors have found the existing techniques problematic in that the target storing unit in which targets containing valuable substances are stored may deteriorate, and in that the grades and the recovery rates of valuable substances recovered may not be sufficient.

The present inventors have conceived the present invention through earnest studies into a method for recovering a valuable substance, the method being able to inhibit deterioration of a target storing unit in which a target containing a valuable substance is stored, and to recover the valuable substance at a high recovery rate at a high grade.

That is, the present inventors have found it possible to inhibit deterioration of a target storing unit in which a target containing a valuable substance is stored, and to recover the valuable substance at a high recovery rate at a high grade, by a method for recovering a valuable substance, the method including a thermal treatment step of thermally treating a target, which contains a valuable substance and is stored in a target storing unit, via a flame blocking unit configured to block a flame for thermally treating the target such that the target storing unit is not contacted by the flame, and a valuable substance recovering step of recovering the valuable substance from a thermally treated product of the target obtained in the thermal treatment step.

According to the method for recovering a valuable substance of the present invention, the target containing a valuable substance and stored in the target storing unit is thermally treated via the flame blocking unit configured to block the flame for thermally treating the target such that the target storing unit is not contacted by the flame (thermal treatment step).

In this way, according to the present invention, the thermal treatment is performed while the flame for the thermal treatment is blocked by the flame blocking unit such that the target storing unit is not contacted by the flame. In other words, in the present invention, the target is thermally treated while the flame blocking unit is blocking the flame for the thermal treatment such that the target storing unit is not contacted by the flame.

Hence, according to the present invention, it is possible to avoid the target storing unit being heated excessively, and to inhibit deterioration of the target storing unit. Moreover, according to the present invention, because it is possible to inhibit deterioration of the target storing unit, it is possible to save maintenance costs for, for example, replacement and repair of the target storing unit.

Moreover, according to the method for recovering a valuable substance of the present invention, because it is possible to inhibit deterioration of the target storing unit since it is ensured that the target storing unit is not contacted by the flame for thermal treatment, it is possible to inhibit the valuable substance (for example, copper) contained in the target from being oxidized and embrittled due to, for example, the target storing unit being broken and the target being directly contacted by the flame for thermal treatment. Hence, it is possible to recover the valuable substance at a high recovery rate at a high grade in the valuable substance recovering step.

In this way, the method for recovering a valuable substance of the present invention including the thermal treatment step and the valuable substance recovering step specified above can inhibit deterioration of the target storing unit in which the target containing a valuable substance is stored, and can recover the valuable substance at a high recovery rate at a high grade.

In the following description, the details of, for example, the steps of the method for recovering a valuable substance of the present invention will be described.

<Thermal Treatment Step>

The thermal treatment step is a step of thermally treating a target, which contains a valuable substance and is stored in a target storing unit, via a flame blocking unit configured to block a flame for thermally treating the target such that the target storing unit is not contacted by the flame. In other words, for example, the thermal treatment step is a step of thermally treating a target stored in the target storing unit while the flame for thermal treatment is blocked by the flame blocking unit such that the target storing unit is not contacted by the flame, to thereby obtain a thermally treated product. A thermally treated product represents a product obtained by thermally treating the target.

<<Target and Valuable Substance>>

The target is not particularly limited and may be appropriately selected in accordance with the intended purpose so long as the target contains a valuable substance and can be thermally treated in a continuous furnace while being stored in the target storing unit. Examples of the target include secondary batteries such as a lithium ion secondary battery and a nickel-hydrogen battery. Representatively, it is preferable to use a lithium ion secondary battery.

A valuable substance represents a substance that can suffice as a transaction object without being discarded. Examples of the valuable substance include various metals. When the target is a lithium ion secondary battery, examples of the valuable substance include a carbon (C) concentrate having a high-grade, copper (Cu), aluminum (Al), lithium (Li), cobalt (Co), and nickel (Ni). A carbon (C) concentrate having a high grade (e.g., a grade of 80% or higher) can be suitably used as, for example, a reductant in smelting of metals.

—Lithium Ion Secondary Battery—

The lithium ion secondary battery is not particularly limited and may be appropriately selected in accordance with the intended purpose. Examples of the lithium ion secondary battery include defective lithium ion secondary batteries generated in the production process of lithium ion secondary batteries, lithium ion secondary batteries discarded due to, for example, defects of the devices in which they are used and expired life of the devices in which they are used, and used lithium ion secondary batteries discarded due to expired life.

The structure, size, and material of the lithium ion secondary battery are not particularly limited and may be appropriately selected in accordance with the intended purpose.

The shape of the lithium ion secondary battery is not particularly limited and may be appropriately selected in accordance with the intended purpose. Examples of the shape of the lithium ion secondary battery include a laminate shape, a cylindrical shape, a button shape, a coin shape, a square shape, and a flat shape.

The form of the lithium ion secondary battery is not particularly limited and may be appropriately selected in accordance with the intended purpose. Examples of the form of the lithium ion secondary battery include a battery cell, a battery module, and a battery pack. A battery module represents a product including a plurality of battery cells, which are unit cells, in one housing in a connected state. A battery pack represents a product including a plurality of battery modules in one housing. A battery pack may be equipped with, for example, a controller or a cooling device.

Examples of the lithium ion secondary battery include a lithium ion secondary battery including a positive electrode, a negative electrode, a separator, an electrolytic solution containing an electrolyte and an organic solvent, and an exterior container, which is a battery case in which the positive electrode, the negative electrode, the separator, and the electrolytic solution are stored. A lithium ion secondary battery from which, for example, a positive electrode or a negative electrode is lost, may also be used.

—Positive Electrode—

The positive electrode is not particularly limited and may be appropriately selected in accordance with the intended purpose. It is preferable that the positive electrode includes a positive electrode current collector and contains a positive electrode material containing either or both of cobalt and nickel. The shape of the positive electrode is not particularly limited and may be appropriately selected in accordance with the intended purpose. Examples of the shape of the positive electrode include a flat plate shape and a sheet shape.

—Positive Electrode Current Collector—

For example, the shape, structure, size, and material of the positive electrode current collector are not particularly limited and may be appropriately selected in accordance with the intended purpose.

Examples of the shape of the positive electrode current collector include a foil shape.

Examples of the material of the positive electrode current collector include stainless steel, nickel, aluminum, copper, titanium, and tantalum. Among these materials, aluminum is preferable.

The positive electrode material is not particularly limited and may be appropriately selected in accordance with the intended purpose. Examples of the positive electrode material include a positive electrode material that contains at least a positive electrode active substance containing lithium, and that contains a conducting agent and a binder resin as needed.

The positive electrode active substance is not particularly limited and may be appropriately selected in accordance with the intended purpose. A positive electrode active substance containing either or both of cobalt and nickel is preferable.

Examples of the positive electrode active substance include lithium manganate ($LiMn_2O_4$) referred to as an LMO system, lithium cobaltate ($LiCoO_2$) referred to as an LCO system, $LiNi_xCo_yMn_zO_2$ (x+y+z=1) referred to as a ternary system and an NCM system, $LiNi_xCo_yAl_z$ (x+y+z=1) referred to as an NCA system, lithium iron phosphate ($LiFePO_4$), lithium cobalt-nickelate ($LiCo_{1/2}Ni_{1/2}O_2$), and lithium titanate ($Li_2TiO_3$). As the positive electrode active substance, these materials may be used in combination.

The conducting agent is not particularly limited and may be appropriately selected in accordance with the intended purpose. Examples of the conducting agent include carbon black, graphite, carbon fiber, and metal carbides.

The binder resin is not particularly limited and may be appropriately selected in accordance with the intended purpose. Examples of the binder resin include homopolymers or copolymers of, for example, vinylidene fluoride, tetrafluoroethylene, acrylonitrile, and ethylene oxide, and styrene-butadiene rubbers.

—Negative Electrode—

The negative electrode is not particularly limited and may be appropriately selected in accordance with the intended purpose. It is preferable that the negative electrode includes a negative electrode current collector and contains a negative electrode active substance containing carbon (C).

The shape of the negative electrode is not particularly limited and may be appropriately selected in accordance with the intended purpose. Examples of the shape of the negative electrode include a flat plate shape and a sheet shape.

—Negative Electrode Current Collector—

For example, the shape, structure, size, and material of the negative electrode current collector are not particularly limited and may be appropriately selected in accordance with the intended purpose.

Examples of the shape of the negative electrode current collector include a foil shape.

Examples of the material of the negative electrode current collector include stainless steel, nickel, aluminum, copper, titanium, and tantalum. Among these materials, copper is preferable.

The negative electrode active substance is not particularly limited and may be appropriately selected in accordance with the intended purpose so long as the negative electrode active substance contains carbon (C). Examples of the negative electrode active substance include carbon materials such as graphite and hard carbon, titanate, and silicon. As the negative electrode active substance, these materials may be used in combination.

The material of the exterior container (housing) of the lithium ion secondary battery is not particularly limited and may be appropriately selected in accordance with the intended purpose. Examples of the material of the exterior container include aluminum, iron, stainless steel, and resins (plastics).

According to the present invention, for example, when a lithium ion secondary battery containing a large quantity of aluminum, such as a lithium ion secondary battery having a housing formed of aluminum, is the target, it is possible to melt aluminum, which is an example of the valuable substance, and separate aluminum as a melted product in the thermal treatment step. In other words, in the method for recovering a valuable substance of the present invention, it is preferable that the lithium ion secondary battery has a housing containing aluminum, and that aluminum of the housing of the lithium ion secondary battery be melted and a melted product be separated in the thermal treatment step.

<<Target Storing Unit>>

The target storing unit is not particularly limited and may be appropriately selected in accordance with the intended purpose so long as the target can be stored in the target storing unit. Examples of the target storing unit include a container, a drum, and the exterior container of a lithium ion secondary battery pack or module.

As the material of the target storing unit, for example, one that has a melting point higher than the temperature (thermal treatment temperature) in the thermal treatment is preferable. More specifically, for example, iron and stainless steel are preferable as the material of the target storing unit.

In other words, in the method for recovering a valuable substance of the present invention, it is preferable that the target storing unit be formed of iron or stainless steel. Such a target storing unit can be better inhibited from, for example, deterioration, deformation, and breakage in the thermal treatment.

The size of the target storing unit is not particularly limited and may be appropriately selected in accordance with the intended purpose so long as the target can be stored in the target storing unit. For example, the size of the target storing unit may be a size that can be placed in a heating section (an inside space of a furnace) of a thermal treatment furnace (roasting furnace) configured to perform thermal treatment.

The shape and structure of the target storing unit are not particularly limited and may be appropriately selected in accordance with the intended purpose so long as the target can be stored in the target storing unit.

It is preferable that the target storing unit has an opening through which a gas is circulatable. In this case, it is preferable that a lithium ion secondary battery be stored in the target storing unit such that a gas does not circulate through any place other than the opening. With an opening in the storing container, it is possible to control the pressure and the atmosphere inside the storing container.

The shape of the opening is not particularly limited and may be appropriately selected in accordance with the intended purpose. The position of the opening on the target storing unit is not particularly limited and may be appropriately selected in accordance with the intended purpose so long as a gas is circulatable through the position during thermal treatment. A plurality of openings may be formed in the target storing unit. A hole formed in the exterior container of a lithium ion secondary battery pack or module may be used as the opening. A lithium ion secondary battery pack typically has a hole through which a cable or a plug for charging or discharging is connected to a portion inside the pack or module in which electricity flows. This hole may be used as the opening.

The size (area) of the opening is not particularly limited, may be appropriately selected in accordance with the intended purpose, and is preferably less than or equal to 12.5% and more preferably less than or equal to 6.3% of the surface area of the target storing unit. When the size of the opening is less than or equal to 12.5% of the surface area of the target storing unit, it is possible to inhibit oxidization of valuable substances contained in the current collectors during thermal treatment. In the following description, the area of the opening relative to the surface area of the target storing unit may be referred to as an "opening percentage".

When the target storing unit has a plurality of openings, the opening percentage may be the total of the areas of the openings relative to the surface area of the target storing unit.

When the opening percentage of the target storing unit is in the preferable range specified above, the atmosphere inside the target storing unit during thermal treatment can become a hypoxic atmosphere, provided that the atmosphere outside the target storing unit is, for example, the atmospheric atmosphere.

As the target storing unit, one that has an openable and closable lid for letting in a lithium ion secondary battery is preferable. This facilitates storing of the lithium ion secondary battery inside the target storing unit, and removal of the thermally treated lithium ion secondary battery (thermally treated product) after the thermal treatment step.

The lid is not particularly limited and may be appropriately selected in accordance with the intended purpose.

The lid may be secured in an openable and closable manner by, for example, a hinge. Alternatively, the lid may be attached or detached for opening and closing.

<<Flame Blocking Unit>>

The flame blocking unit used in the thermal treatment step is not particularly limited and may be appropriately selected in accordance with the intended purpose so long as the flame blocking unit can block a flame for thermally treating the target such that the target storing unit is not contacted by the flame.

The number of flame blocking units used in thermal treatment is not particularly limited and may be appropriately selected in accordance with the intended purpose. When providing a plurality of flame blocking units, it is preferable to provide a space between adjoining flame blocking units. By providing a space between adjoining flame blocking units, it is easy to control thermal insulation.

The position at which the flame blocking unit is disposed is not particularly limited and may be appropriately selected in accordance with the intended purpose so long as the flame for thermal treatment can be blocked. A position between the target storing unit and a flame radiating unit configured to radiate a flame is preferable. In other words, in the present invention, it is preferable to thermally treat the target in the thermal treatment step by providing the flame blocking unit between the target storing unit and the flame radiating unit configured to radiate a flame.

In this way, it is possible to more securely block a flame radiated by the flame radiating unit such that the target storing unit is not contacted by the flame, and to better inhibit deterioration of the target storing unit.

For example, when performing thermal treatment, by disposing the flame blocking unit at a position between the target storing unit and the flame radiating unit in a direction from which the flame radiating unit radiates a flame and bringing a flame into direct contact with the flame blocking unit, it is possible to thermally treat the target stored in the target storing unit via the flame blocking unit.

In this way, in the present invention, for example, by disposing the flame blocking unit in a direction from which the flame radiating unit radiates a flame (flame radiating direction) and thermally treating the target via the flame blocking unit, it is possible to efficiently transfer the heat of the flame to the target and thermally treat the target while better inhibiting deterioration of the target storing unit.

A preferable material of the flame blocking unit is one that has a melting point higher than the temperature (thermal treatment temperature) during thermal treatment. Specific examples of the material of the flame blocking unit include iron and stainless steel. Of these materials, stainless steel is preferred in terms of heat resistance. In other words, in the method for recovering a valuable substance of the present invention, it is preferable that the flame blocking unit be formed of stainless steel.

Examples of the kinds of stainless steel of which the flame blocking unit is formed include SUS304, SUS309, SUS309S, SUS310, SUS310S, SUS316, and SUS316L.

The size of the flame blocking unit is not particularly limited and may be appropriately selected in accordance with the intended purpose so long as the flame blocking unit can block the flame for thermal treatment. It is preferable to select the size of the flame blocking unit in accordance with, for example, the specifications of the combustion furnace used for thermal treatment, the direction from which or the position at which the flame is radiated, and the size of the target storing unit.

More specifically, for example, when bringing a flame into direct contact with the flame blocking unit while disposing the flame blocking unit at a position between the target storing unit and the flame radiating unit in the direction from which a flame is radiated, it is preferable that the size of the flame blocking unit be a size sufficiently larger than an area of a portion of the flame blocking unit contacted by the flame, and that the size of the flame blocking unit be a size by which the target storing unit and the flame radiating unit can be spatially separated from each other.

The shape of the flame blocking unit is not particularly limited and may be appropriately selected in accordance with the intended purpose so long as the flame blocking unit can block the flame for thermal treatment. Examples of the shape of the flame blocking unit include a plate shape, a tubular shape, and a box shape. Among these shapes, a plate shape is preferable as the shape of the flame blocking unit. In other words, in the present invention, it is preferable that the flame blocking unit has a plate shape.

As the flame blocking unit having a plate shape, for example, one that has a flat shape (of which the length in the thickness direction is shorter than the lengths in the planar direction) may be used. The planar shape of the flame blocking unit having a plate shape is not particularly limited and may be appropriately selected in accordance with the intended purpose. Examples of the planer shape of the flame blocking unit include a polygonal shape and a circular shape (disk shape).

The flame blocking unit having a plate shape may be, for example, one that has a flat plate shape or one that has a curved plate shape. As the flame blocking unit having a curved plate shape, for example, one that has a half arc cross-sectional shape or a wavy cross-sectional shape may be used.

As the flame blocking unit having a plate shape, for example, a component generally referred to as a shielding plate or a partition may be used.

The structure of the flame blocking unit is not particularly limited and may be appropriately selected in accordance with the intended purpose. The structure of the flame blocking unit may be, for example, a single layer structure or a multi-layer structure. For example, when the flame blocking unit has a multi-layer structure, the respective layers may be formed of different materials.

The structure of the flame blocking unit may be, for example, porous inside. By using a porous material as the flame blocking unit, it is easy to control the adiabaticity of the flame blocking unit.

The flame blocking unit may have a structure (mechanism) that makes the flame blocking unit able to move (movable).

More specifically, it is preferable to use a plate-shaped component formed of stainless steel (or a stainless-steel shielding plate) as the flame blocking unit.

In the present invention, for example, by disposing the stainless-steel shielding plate at a position between the target storing unit and the flame radiating unit such that the planar portion of the stainless-steel shielding plate is approximately orthogonal to the flame radiating direction (irradiation direction) and thermally treating the target stored in the target storing unit by bringing a flame into direct contact with the flame blocking unit, it is possible to more securely avoid the target storing unit being contacted by the flame and to better inhibit deterioration of the target storing unit.

The average thickness of a region of the flame blocking unit contacted by the flame for thermal treatment is not particularly limited and may be appropriately selected in accordance with the intended purpose so long as the flame can be blocked during the thermal treatment. More specifically, the average thickness of a region of the flame blocking unit contacted by the flame is preferably 3 mm or greater and more preferably 5 mm or greater.

In the present invention, for example, when the average thickness of a region of the flame blocking unit contacted by the flame is 3 mm or greater, it is possible to avoid the flame blocking unit itself from being damaged by deterioration. This makes it possible to more securely avoid the target storing unit being contacted by the flame and to better inhibit deterioration of the target storing unit.

In the thermal treatment step, for example, a publicly-known roasting furnace (combustion furnace) can be used. The roasting furnace (combustion furnace) is not particularly limited and may be appropriately selected in accordance with the intended purpose so long as the roasting furnace can thermally treat (heat) the target by a flame. As such a roasting furnace, for example, a fixed bed furnace and a continuous furnace can be suitably used. Examples of the fixed bed furnace include a cylindrical fixed bed furnace. Examples of the continuous furnace include a pusher type continuous furnace.

The flame for thermal treatment can be radiated by a flame radiating unit provided in the roasting furnace. The flame radiating unit is not particularly limited and may be appropriately selected in accordance with the intended purpose. Examples of the flame radiating unit include a burner.

FIG. 1A is a concept diagram illustrating an example cylindrical fixed bed furnace that can be used in the method for recovering a valuable substance of the present invention.

As illustrated in FIG. 1A, the cylindrical fixed bed furnace 100 includes a heating section 10, burners 11, a front shutter 12, a front shutter opening/closing device 13, and a temperature sensor 14. In the example illustrated in FIG. 1A, when both or either of the burners 11 provided on the left and right-hand sides in the heating section 10 radiate flames, the target disposed inside the heating section 10 can be thermally treated. As illustrated in FIG. 1A, for disposing the target inside the heating section 10, the front shutter opening/closing device 13 brings the front shutter 12 upward to an open state, and for performing thermal treatment, the front shutter opening/closing device 13 brings the front shutter 12 downward to a closed stated and the burners 11 radiate flames. During thermal treatment, the temperature sensor 14 can measure the thermal treatment temperature.

FIG. 1A is a concept diagram of the inside space of the cylindrical fixed bed furnace 100 seen in a horizontal perspective.

In the present invention, as illustrated in FIG. 1A, for example, a target storing unit 20 in which a target is stored is disposed on a receptacle 21 into which to recover melted aluminum inside the heating section 10. Moreover, in the present invention, as illustrated in FIG. 1, for example, flame blocking units 22 are disposed at positions between the target storing unit 20 and the burners 11 in the direction from which the burners 11 radiate flames. In the example illustrated in FIG. 1A, the flame blocking units 22 are ones that have a flat plate shape formed of stainless steel, and are provided on the receptacle 21.

In the present invention, for example, as illustrated in FIG. 1A, since the flame blocking units 22 are provided during thermal treatment, the flames for thermal treatment can be blocked by the flame blocking units 22, and the target stored in the target storing unit 20 is thermally treated while it is ensured that the target storing unit 20 is not contacted by the flames. Hence, according to the present invention, it is possible to avoid overheating the target storing unit 20 and to inhibit deterioration of the target storing unit 20.

Figure 1B:
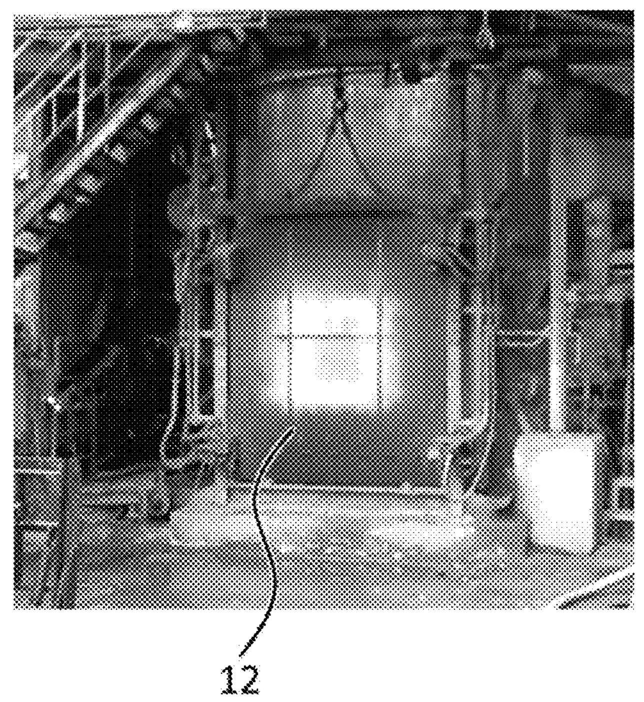
FIG. 1B is a captured image of an example heating section of a cylindrical fixed bed furnace as illustrated in FIG. 1A when a front shutter is closed.

FIG. 1B is a captured image of an example heating section of a cylindrical fixed bed furnace as illustrated in FIG. 1A when the front shutter is brought down.

In the example in the captured image illustrated in FIG. 1B, what is reflected in the captured image is the front shutter 12 in the center. The burners disposed on the left and right-hand sides of FIG. 1B radiate flames to perform thermal treatment.

In the present invention, when the target is a lithium ion secondary battery, it is preferable to observe the combustion state of the lithium ion secondary battery in the thermal treatment step to judge whether combustion of the lithium ion secondary battery has finished or not, and to terminate the thermal treatment when it is judged that combustion of the lithium ion secondary battery has finished. This makes it possible to thermally treat the lithium ion secondary battery without overdoing or underdoing, to better inhibit deterioration of the target storing unit, and to perform the thermal treatment more efficiently in a short time.

The method for observing the combustion state of the lithium ion secondary battery is not particularly limited and may be appropriately selected in accordance with the intended purpose. Examples of the method include visual observation, an analysis of an image captured by a camera, an analysis of temperature information obtained by thermography, a thermocouple, or a radiation thermometer, and an analysis of changes in the concentrations of gases (e.g., CO, $CO_2$, and $O_2$). These methods may be used in combination.

More specifically, it is possible to judge whether combustion of a lithium ion secondary battery has finished or not, by, for example, confirming extinction of ignition from the target storing unit based on an image captured by a camera installed inside the furnace, or opening the entrance of the furnace only to a degree that the gas inside the furnace does not leak outside the system and confirming extinction of ignition from the target storing unit by visual observation from outside the furnace.

When terminating the thermal treatment when it is judged that combustion of the lithium ion secondary battery has finished, it is optional whether to completely stop the flame or to radiate a flame necessary to retain the temperature inside the roasting furnace.

<<Thermal Treatment Conditions>>

The conditions (thermal treatment conditions) for thermally treating (heating) the target are not particularly limited and may be appropriately selected in accordance with the intended purpose, so long as the conditions enable the respective constituent components of the target to be brought into a state from which a valuable substance can be recovered in the valuable substance recovering step described below.

Examples of the thermal treatment conditions include thermal treatment temperature, thermal treatment time, and atmosphere.

The thermal treatment temperature represents a temperature of the target (for example, a lithium ion secondary battery) during the thermal treatment. It is possible to measure the thermal treatment temperature by inserting a thermometer such as a thermocouple or a thermistor into the target at the thermal treatment temperature.

The thermal treatment temperature can be appropriately selected in accordance with the target.

When the target is a lithium ion secondary battery, it is preferable that the thermal treatment temperature be higher than or equal to the melting point of the housing (exterior container) of the lithium ion secondary battery. At such a temperature, when the housing of the lithium ion secondary battery is formed of a metal, the housing can be melted in the thermal treatment step, and, for example, it is easy to recover the metal derived from the housing and, for example, the electrodes of the lithium ion secondary battery separately from each other by disposing a receptacle into which to recover the melted metal of the housing below the lithium ion secondary battery.

More specifically, for example, when the housing of a lithium ion secondary battery contains aluminum, it is preferable that the thermal treatment temperature be higher than or equal to 660° C., which is the melting point of aluminum. This makes it possible to melt and recover aluminum contained in the housing of the lithium ion secondary battery in the thermal treatment step. That is, when a lithium ion secondary battery including a housing containing aluminum is the target, the method for recovering a valuable substance of the present invention can easily recover aluminum derived from the housing by easily sorting (separating) aluminum contained in the housing and other parts (for example, electrodes) of the lithium ion secondary battery from each other by thermally treating the lithium ion secondary battery at higher than or equal to 660° C. in the thermal treatment step.

For recovering aluminum of the housing of the lithium ion secondary battery, for example, a receptacle for aluminum may be disposed below the target storing unit in the thermal treatment step and aluminum may be recovered.

In the method for recovering a valuable substance of the present invention, when the target is a lithium ion secondary battery, the thermal treatment temperature is preferably 750° C. or higher, more preferably 750° C. or higher and 1,080° C. or lower, and particularly preferably 750° C. or higher and 900° C. or lower.

When the thermal treatment temperature is 750° C. or higher, lithium in $Li(Ni/Co/Mn)O_2$ contained in the positive electrode active substance of the lithium ion secondary battery or lithium in $LiPF_6$ contained in the electrolyte of the lithium ion secondary battery can be changed to aqueous solution-soluble substances, such as lithium fluoride (LiF), lithium carbonate ($Li_2CO_3$), and lithium oxide ($Li_2O$), so it is possible to separate lithium from impurities other than fluorine by leaching. Moreover, when the thermal treatment temperature is 750° C. or higher, cobalt oxide and nickel oxide contained in the positive electrode active substance are reduced to metals, and it is possible to grow these metals to a particle diameter with which it is easy to magnetically attract the metals in a magnetic sorting step described below. This increase in the particle diameter of the metals is more apparent as the thermal treatment is performed at a higher temperature.

Moreover, for example, when a lithium ion secondary battery including a housing containing aluminum is the target and the thermal treatment temperature is higher than or equal to 750° C. (which is a temperature higher than 660° C., which is the melting point of aluminum) and lower than 1,085° C. (which is the melting point of copper), it is possible to separate and recover aluminum derived from the housing, and to better inhibit oxidization or embrittlement of copper contained in the negative electrode current collector and better improve the recovery rate and the grade of copper.

The thermal treatment time (a time for which the target is thermally treated) is not particularly limited, may be appropriately selected in accordance with the intended purpose, and is preferably, for example, 1 minute or longer and 5 hours or shorter, more preferably 1 minute or longer and 2 hours or shorter, and particularly preferably 1 minute or longer and 1 hour or shorter. The thermal treatment time may be, for example, a time taken until the target reaches the thermal treatment temperature specified above, and the retention time may be short. When the thermal treatment time is 1 minute or longer and hours or shorter, there are advantages that the costs taken for thermal treatment can be saved, and the thermal treatment efficiency can be improved.

The atmosphere used in the thermal treatment is not particularly limited and may be appropriately selected in accordance with the intended purpose. Examples of the atmosphere include an atmospheric atmosphere, an inert atmosphere, a reducing atmosphere, and a hypoxic atmosphere.

The atmospheric atmosphere represents an atmosphere using air.

Examples of the inert atmosphere include an atmosphere formed of nitrogen or argon.

The reducing atmosphere represents an atmosphere in which an inert atmosphere such as nitrogen or argon contains, for example, CO, $H_2$, $H_2S$, and $SO_2$.

The hypoxic atmosphere represents an atmosphere in which an oxygen partial pressure is 11% or lower.

Among these atmospheres, the hypoxic atmosphere is preferable because the hypoxic atmosphere can minimize oxidization of the target storing unit and of valuable substances such as copper by oxygen and it is possible to realize the hypoxic atmosphere by controlling the amount of oxygen to be supplied to the burners without a special atmosphere adjustment.

<Valuable Substance Recovering Step>

The valuable substance recovering step is a step of recovering a valuable substance from a thermally treated product of the target obtained in the thermal treatment step.

The valuable substance recovering step is not particularly limited and may be appropriately selected in accordance with the intended purpose so long as a valuable substance can be recovered from the thermally treated product. As described above, it is preferable that the valuable substance recovering step includes a pulverizing step, a classifying step, and a magnetic force sorting step.

<<Pulverizing Step>>

The pulverizing step is a step of pulverizing a thermally treated product to obtain a pulverized product.

The pulverizing step is not particularly limited and may be appropriately selected in accordance with the intended purpose so long as the pulverizing step is a step of pulverizing a thermally treated product (roasted product) to obtain a pulverized product. The pulverized product represents a product obtained by pulverizing a thermally treated product.

The pulverizing step is preferably a step of pulverizing a thermally treated product by, for example, an impact, to obtain a pulverized product. For example, when a lithium ion secondary battery is selected as the target, it is more preferable to perform a preparatory pulverization, in which a thermally treated product is cut with a cutting device, before applying an impact to the thermally treated product, when there is a condition of not melting the housing of the lithium ion secondary battery in the thermal treatment step.

Examples of the pulverization method by an impact include a method of throwing the thermally treated product using a rotating beating board and slamming the thermally treated product against an impact board to apply an impact, and a method of beating the thermally treated product using a rotating beater. The method can be performed with, for example, a hammer crusher. The pulverization method by an impact may be a method of beating the thermally treated product using a ball formed of, for example, ceramic. This method can be performed with a ball mill. Pulverization by an impact can also be performed with, for example, a biaxial crusher configured to perform pulverization by compression and having a short width of cut and a short blade length.

Examples of the pulverization method by an impact also include a method of beating the thermally treated product with two rotating chains to apply an impact. This method can be performed with a chain mill.

By pulverization of a thermally treated product of a lithium ion secondary battery by an impact, the positive electrode current collector (for example, aluminum (Al)) is pulverized, whereas the negative electrode current collector (for example, copper (Cu)) that does not significantly change in form exists in the form of, for example, a foil. Therefore, in the pulverizing step, the negative electrode current collector does not go beyond being cut. Hence, it is possible to obtain a pulverized product in which valuable substances derived from the positive electrode current collector (for example, aluminum) and valuable substances derived from the negative electrode current collector (for example, copper (Cu)) can be efficiently separated from each other in a classifying step described below.

The pulverization time in the pulverizing step is not particularly limited and may be appropriately selected in accordance with the intended purpose. For example, when the target is a lithium ion secondary battery, the pulverization time per 1 kg of a lithium ion secondary battery is preferably 1 second or longer and 30 minutes or shorter, more preferably 2 seconds or longer and 10 minutes or shorter, and particularly preferably 3 seconds or longer and 5 minutes or shorter.

The pulverization conditions in the pulverizing step are as follows. For example, for pulverization using an impact-type or beating-type pulverizer such as a chain mill or a hammer mill, it is preferable to set the tip speed of the chain or the hammer to 10 m/sec or higher and 300 m/sec or lower, and to set the retention time of the target in the pulverizer to 1 second or longer and 10 minutes or shorter. In the method for recovering a valuable substance of the present invention, these conditions make it possible to pulverize copper and aluminum, which are positive electrode materials, and members derived from the housing and formed of, for example, Fe, without excessively minutely pulverizing them.

<<Classifying Step>>

The classifying step is a step of classifying a pulverized product at a classification point of 0.6 mm or greater and 2.4 mm or less to obtain a coarse-grained product and a fine-grained product.

The classifying step is not particularly limited and may be appropriately selected in accordance with the intended purpose so long as the classifying step is a step through which it is possible to obtain a coarse-grained product and a fine-grained product by classifying a pulverized product at a classification point of 0.6 mm or greater and 2.4 mm or less. When the target is a lithium ion secondary battery, it is possible to separate, for example, copper (Cu), iron (Fe), and aluminum (Al) into a coarse-grained product and separate, for example, lithium (Li), cobalt (Co), nickel (Ni), manganese (Mn), and carbon (C) into a fine-grained product through the classifying step.

The classifying step can be performed using, for example, a vibrating sieve, a multi-stage vibrating sieve, a cyclone, and a JIS 28801 standard sieve.

The particle size (classification point or mesh size of a sieve) for classification is preferably 0.6 mm or greater and 2.4 mm or less, more preferably 0.85 mm or greater and 1.7 mm or less, and particularly preferably approximately 1.2 mm.

When the particle size for classification is 2.4 mm or less, it is possible to inhibit inclusion of, for example, copper (Cu), iron (Fe), and aluminum (Al) into the fine-grained product. When the particle size for classification is 0.6 mm or greater, it is possible to inhibit inclusion of, for example, carbon (C), lithium (Li), cobalt (Co), nickel (Ni), and manganese (Mn) into the coarse-grained product.

Sieving (classification) into an oversize product (coarse-grained product) and an undersize product (fine-grained product) may be repeated a plurality of times. This re-sieving can further reduce the impurity grade in each product.

The pulverizing step and the classifying step may be performed simultaneously. For example, the pulverizing step and the classifying step may be performed as a pulverizing/classifying step (pulverization and classification) of pulverizing a thermally treated product obtained in the thermal treatment step while classifying an obtained pulverized product into a coarse-grained product and a fine-grained product.

<<Magnetic Force Sorting Step>>

The magnetic force sorting step is a step of sorting a coarse-grained product using a magnet having a magnetic flux density of 0.03 tesla or higher. In other words, in the magnetic force sorting step, a pulverized product is subjected to sorting by a magnetic force, to thereby recover a valuable substance from the target (or from a pulverized product obtained by thermally treating and pulverizing the target). In the following description, sorting by a magnetic force may be referred to as "magnetic force sorting" or "magnetic sorting".

The magnetic force sorting step can be performed using, for example, a publicly-known magnetic force sorter (magnetic sorter).

The magnetic force sorter that can be used in the present invention is not particularly limited and may be appropriately selected in accordance with the intended purpose. Examples of the magnetic force sorter include a bar magnet, a lattice magnet, a rotary magnet, a magnet strainer, a high magnetic force pulley (magnet pulley) magnetic sorter, a drum-shaped magnetic sorter, and a suspended magnetic sorter. Among these magnetic force sorters, it is preferable to use a drum-shaped magnetic sorter and a suspended magnetic sorter in the present invention.

In the magnetic force sorting step, for example, sorting is performed with a magnetic force that can sort a magnetically attractable material and a non-magnetically attractable material contained in the target from each other depending on the kind of the target (or the kinds of valuable substances contained in the target).

A magnetically attractable material represents a material that can be attracted to a magnetic force source by an attractive force generated between the material and the magnetic force source by a magnetic force generated by the magnetic force source configured to generate a magnetic force (a magnetic field) (for example, a magnet and an electromagnet). Examples of the magnetically attractable material include ferromagnetic metals. Examples of ferromagnetic metals include iron, nickel, and cobalt.

A non-magnetically attractable material represents a material that is not attracted to the magnetic force source by a magnetic force generated by the magnetic force source. The non-magnetically attractable material is not particularly limited and may be appropriately selected in accordance with the intended purpose. Examples of non-magnetically attractable metal materials include paramagnetic or diamagnetic metals. Examples of paramagnetic or diamagnetic metals include aluminum, manganese, gold, silver, and copper.

For example, when a lithium ion secondary battery is selected as the target, magnetically attractable materials such as iron contained in the pulverized product and non-magnetically attractable materials containing, for example, copper, which is a valuable substance, contained in the pulverized product can be separated from each other in the magnetic force sorting step.

In the above example in which a lithium ion secondary battery is the target, a case where the valuable substance to be sorted is contained in the non-magnetically attractable materials is described. The present invention is not limited to this example. For example, depending on the kind of the target, the valuable substance to be sorted may be contained in the magnetically attractable materials.

The magnetic force in the magnetic force sorting step is not particularly limited and may be appropriately selected in accordance with the intended purpose so long as the magnetic force is 0.03 T (tesla) or higher. For example, when sorting iron, the magnetic force is preferably 0.01 T (tesla) or higher and 0.3 T or lower. When sorting stainless steel, a magnetic force higher than the range specified above may be used. Different magnetic forces may be combined and used in multiple stages.

In this way, the method for recovering a valuable substance of the present invention can selectively separate magnetically attractable materials such as iron and stainless steel.

<Other Steps>

The other steps are not particularly limited and may be appropriately selected in accordance with the intended purpose.

EXAMPLE EMBODIMENT

Here, an example embodiment of the recovering method for a lithium ion secondary battery of the present invention will be described. The present embodiment is an example in which a lithium ion secondary battery is selected as the target.

In the present embodiment, first, the lithium ion secondary battery as the target is placed in a drum serving as the target storing unit. A plurality of holes having a size through which the lithium ion secondary battery does not fall are opened in the drum, and a receptacle into which to recover aluminum is disposed below the drum.

Using a cylindrical fixed bed furnace as illustrated in FIG. 1A in which burners serving as the flame radiating units are disposed on the sides of the drum, with one burner on the left-hand side and one burner on the right-hand side, respectively, and stainless-steel shielding plates serving as the flame blocking units are disposed between the drum and the burners, thermal treatment is performed such that the drum is not contacted by flames radiated from the burners, to thereby obtain a thermally treated product of the lithium ion secondary battery.

Moreover, during the thermal treatment, the combustion state of the lithium ion secondary battery is observed to judge whether combustion of the lithium ion secondary battery has finished or not. When it is judged that combustion of the lithium ion secondary battery has finished, the thermal treatment is terminated.

Furthermore, during the thermal treatment, the lithium ion secondary battery is thermally treated at 750° C. or higher and lower than 1,085° C., to melt aluminum contained in the lithium ion secondary battery and recover aluminum as a melted product.

Next, the thermally treated product of the lithium ion secondary battery is pulverized to obtain a pulverized product. Subsequently, the pulverized product is classified into a coarse-grained product (oversize product) and a fine-grained product (undersize product). Copper (Cu) is sorted and concentrated into the coarse-grained product (oversize product).

Next, the coarse-grained product (oversize product) is subjected to sorting by a magnetic force (magnetic sorting), to sort the coarse-grained product (oversize product) into magnetically attractable materials and non-magnetically attractable materials. Here, iron (Fe) is sorted and concentrated into the magnetically attractable materials, and copper (Cu), which is a valuable substance, is sorted and concentrated into the non-magnetically attractable materials.

In this way, in the present embodiment, it is possible to recover copper, which is a valuable substance, at a high recovery rate at a high grade while inhibiting deterioration of the container.

<Specific Examples of Target Storing Unit, Flame Blocking Unit, and Receptacle>

Figure 2A:
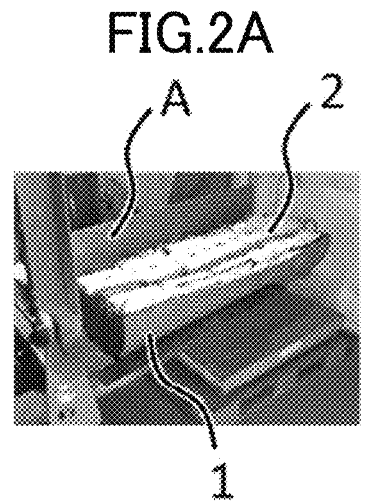
FIG. 2A is a captured image illustrating an example target storing unit and an example flame blocking unit that can be used in the present invention.

FIG. 2A is a shot image illustrating an example target storing unit and an example flame blocking unit that can be used in the present invention.

FIG. 2A illustrates a container 1, which is an example of the target storing unit, and a shielding plate A, which is an example of the flame blocking unit. As illustrated in FIG. 2A, a cross-section of the container 1 in a direction orthogonal to the direction of its longer dimension has an approximately semicircular shape or an approximately U-letter shape, and the shielding plate A has a flat plate shape and is provided in connection with the container 1. As illustrated in FIG. 2A, a lithium ion secondary battery 2 is stored in the container 1, and a plurality of holes through which aluminum contained in the housing of the lithium ion secondary battery 2 is recovered by being melted are opened in the bottom of the container 1.

Figure 2B:
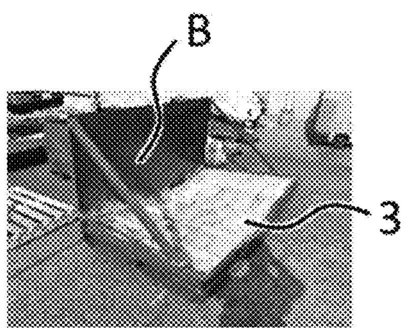
FIG. 2B is a captured image illustrating an example receptacle and an example flame blocking unit that can be used in the present invention.

FIG. 2B is a shot image illustrating an example receptacle and an example flame blocking unit that can be used in the present invention.

FIG. 2B illustrates a receptacle 3 for aluminum, which is an example of the receptacle into which to recover melted aluminum, and a shielding plate B, which is an example of the flame blocking unit. As illustrated in FIG. 2B, the shielding plate B has a plate shape, and is provided in connection with the receptacle 3 for aluminum.

Figure 2C:
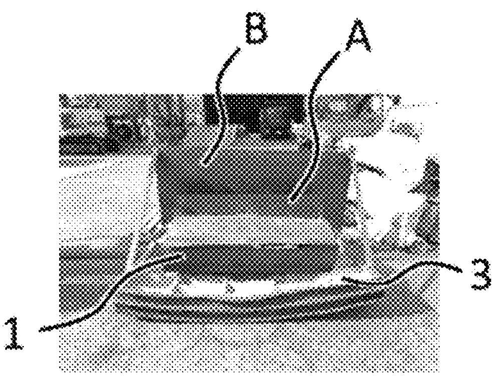
FIG. 2C is a captured image illustrating an example target storing unit, an example flame blocking unit, and an example receptacle that can be used in the present invention.

FIG. 2C is a shot image illustrating an example target storing unit, an example flame blocking unit, and an example receptacle that can be used in the present invention.

FIG. 2C illustrates a state in which the container 1 in which the lithium ion secondary battery 2 is stored and the shielding plate A, which are illustrated in FIG. 2A, are disposed on the receptacle 3 for aluminum having the shielding plate B and illustrated in FIG. 2B.

In the present invention, as illustrated in FIG. 2A to FIG. 2C, it is possible to provide the shielding plates A and B to the container 1 and the receptacle 3 for aluminum, respectively. In other words, in the present invention, different flame blocking units may be provided to the target storing unit and the receptacle.

The examples illustrated in FIG. 2A to FIG. 2C can be suitably used for, for example, thermally treating small-sized lithium ion secondary battery cells.

EXAMPLES

The present invention will be described below by way of Examples. The present invention should not be construed as being limited to these Examples.

Example 1

<Thermal Treatment>

Square-shaped lithium ion secondary battery cells (approximately 100 kg) of which positive electrode material (positive electrode active substance) was $LiNi_xCo_yMn_zO_2$ (x+y+z=1), of which negative electrode material was carbon (graphite), and of which exterior cases were formed of aluminum were used as the target.

Next, a drum serving as the target storing unit was packed with the lithium ion secondary battery cells specified above. A plurality of holes having a size through which the lithium ion secondary batteries would not fall were opened in the drum, and a receptacle into which to recover aluminum was disposed below the drum.

A cylindrical fixed bed furnace (having a diameter of 4,300 mm and a height of 6,500 mm) as illustrated in FIG. 1A was used as the roasting furnace.

In the cylindrical fixed bed furnace illustrated in FIG. 1A, burners serving as the flame radiating units were disposed on the sides of the drum, with one burner on the left-hand side and one burner on the right-hand side, respectively, and plate-shaped components formed of stainless steel and having an average thickness of 5 mm (flat plate-shaped stainless-steel shielding plates) serving as the flame blocking units were disposed between the drum and the burners, to ensure that the drum would not be contacted by flames to be radiated from the burners.

The temperature inside the cylindrical fixed bed furnace was set to approximately 800° C. The temperature was elevated to approximately 800° C. in 15 minutes. Using a camera that displayed the internal view inside the cylindrical fixed bed furnace, whether ignition of the lithium ion secondary batteries inside the drum had finished or not was judged, and when it was judged that ignition of the lithium ion secondary batteries had finished, the burning operation of the burners (radiation of flames) was stopped. Ignition of the lithium ion batteries finished in 1 hour after the temperature elevation specified above had occurred. That is, in Example 1, after the temperature inside the furnace was elevated to 800° C. in 15 minutes and retained at 800° C. for 1 hour, the burning operation of the burners was stopped.

In Example 1, extinction of ignition of the lithium ion secondary batteries was confirmed based on a camera image reflecting the internal view inside the furnace, to thereby judge whether combustion of the lithium ion secondary batteries had finished or not.

<Pulverization and Classification>

Next, using a hammer crusher (MAKING-TYPE SWING HAMMER CRUSHER HC-20-3.7, obtained from Makino Mfg. Co., Ltd.) as a pulverizer, the thermally treated lithium ion secondary batteries (thermally treated product of the lithium ion secondary batteries) were pulverized at 50 Hz (at a hammer circumferential speed of 38 m/s) with a punching metal hole diameter of 10 mm at the outlet, to obtain a pulverized product of the lithium ion secondary batteries.

Next, using a sieve having a mesh size (classification point) of 1.2 mm (with a diameter of 200 mm, obtained from Tokyo Screen Co., Ltd.), the pulverized product of the lithium ion secondary batteries was sieved (classified). After sieving, the oversize product (coarse-grained product) and the undersize product (fine-grained product) above and below the 1.2 mm sieve were collected, respectively.

<Magnetic Force Sorting>

Next, using a drum-shaped dry magnetic sorter (CC 15"ϕ×20"W, obtained from Eriez Magnetics Japan Co., Ltd.) having a magnetic flux density of 1,500 G (0.15 T), the obtained coarse-grained product was subjected to magnetic force sorting at a feed rate of 0.5 kg/minute, to thereby separate and recover magnetically attractable materials and non-magnetically attractable materials.

Example 2

Magnetically attractable materials and non-magnetically attractable materials were separated and recovered in the same manner as in Example 1, except that unlike in Example 1, the burning operation of the burners was stopped after the temperature inside the furnace was elevated to 800° C. in 15 minutes and retained at 800° C. for 3 hours, without judging whether ignition of the lithium ion secondary batteries inside the drum had finished or not.

Comparative Example 1

Magnetically attractable materials and non-magnetically attractable materials were separated and recovered in the same manner as in Example 1, except that unlike in Example 1, the thermal treatment was performed for 1 hour (with retention at approximately 800° C. for 3 hour) while the drum was disposed at a position inside the cylindrical fixed bed furnace at which the drum would be directly contacted by flames radiated from the burners, without disposing the stainless-steel shielding plates.

<Evaluation>

<<Drum Condition after Thermal Treatment>>

The drum (an example of the target storing unit) after the thermal treatment was evaluated as "C" when the drum was bored (broken) by a diameter ((p) of 5 mm or greater, "B"

when the drum was deformed by 10 mm or greater, and "A" when the drum was not bored (broken) and was deformed by less than 10 mm.

<<Recovery Rate and Grade>>

The masses of the fine-grained product, the magnetically attractable materials, and the non-magnetically attractable materials obtained were measured using an electromagnetic balance (product name: GX-8K, obtained from A&D Company, Limited). Subsequently, leaching residues obtained when the magnetically attractable materials and the non-magnetically attractable materials were leached into leaching liquids respectively were heated and dissolved in aqua regia (obtained from FUJIFILM Wako Pure Chemical Corporation), and analyzed by an inductively coupled high-frequency plasma emission spectrometer (ICAP6300, obtained from Thermo Fisher Scientific K.K.), to obtain the content percentages (grades) of copper in the fine-grained product, the magnetically attractable materials, and the non-magnetically attractable materials. In addition, the weight percentage (%) of copper recovered in the non-magnetically attractable materials when the weight of copper contained in all of these products was seen to be 100 was evaluated as the recovery rate of copper.

The condition of the drum (drum condition) after the thermal treatment, and the recovery rate of copper (Cu) and the grade of copper (Cu) in the non-magnetically attractable materials of the coarse-grained product in Example 1, Example 2, and Comparative Example 1 are presented in Table 1.

TABLE 1

| | Drum condition | Copper recovery rate (%) | Copper grade (%) |
|---|---|---|---|
| Ex. 1 | A | 86 | 83 |
| Ex. 2 | B | 80 | 81 |
| Comp. Ex. 1 | C | 23 | 59 |

As presented in Table 1, in Examples 1 and 2, deterioration of the drum was inhibited and the drum was not broken, the recovery rate of copper into the non-magnetically attractable materials of the coarse-grained product was 80% or higher, and the grade of copper in the non-magnetically attractable materials of the coarse-grained product was 80% or higher. As can be seen, in Examples 1 and 2, it was possible to inhibit deterioration of the drum, and to recover copper, which was an example of the valuable substance, at a high recovery rate at a high grade.

In Example 2 in which whether ignition of the lithium ion secondary batteries inside the drum had finished or not was judged, and the burning operation of the burners (radiation of flames) was stopped when it was judged that ignition of the lithium ion secondary batteries had finished, it was possible to better inhibit deterioration of the drum.

On the other hand, in Comparative Example 1, because the drum was deteriorated and broken and copper (Cu) current collectors of the lithium ion secondary batteries were oxidized and embrittled, the recovery rate of copper into the coarse-grained product was low, and the recovery rate of copper into the non-magnetically attractable materials was lower than 30% as a result.

As described above, the method for recovering a valuable substance of the present invention includes a thermal treatment step of thermally treating a target, which contains a valuable substance and is stored in a target storing unit, via a flame blocking unit configured to block a flame for thermally treating the target such that the target storing unit is not contacted by the flame, and a valuable substance recovering step of recovering the valuable substance from a thermally treated product of the target obtained in the thermal treatment step.

Hence, the method for recovering a valuable substance of the present invention can inhibit deterioration of the target storing unit, in which the target containing a valuable substance is stored, and can recover the valuable substance at a high recovery rate at a high grade.

REFERENCE SIGNS LIST

A, B: shielding plate
1: container
2: lithium ion secondary battery
3: receptacle for aluminum
10: heating section
11: burner
12: front shutter
13: front shutter opening/closing device
14: temperature sensor
20: target storing unit
21: receptacle
22: flame blocking unit
100: cylindrical fixed bed furnace

The invention claimed is:

1. A method for recovering a valuable substance, the method comprising:

thermally treating a target at 750° C. or higher and lower than 1,085° C., the target containing a valuable substance and is stored in a target storage, via a flame blocker that is separate from the target storage and provides a barrier that is configured to block a flame that is directed at the flame blocker for thermally treating the target such that the target storage is not contacted by the flame; and recovering the valuable substance from a thermally treated product of the target obtained in the thermally treating.

2. The method for recovering a valuable substance according to claim 1, wherein in the thermally treating, the target is thermally treated while the flame blocker is provided between the target storage and a flame radiator configured to radiate the flame.

3. The method for recovering a valuable substance according to claim 1, wherein the flame blocker is formed of stainless steel.

4. The method for recovering a valuable substance according to claim 1, wherein an average thickness of a region of the flame blocker contacted by the flame is 3 mm or greater.

5. The method for recovering a valuable substance according to claim 1, wherein the flame blocker has a plate shape.

6. The method for recovering a valuable substance according to claim 1, wherein the target storage is formed of iron or stainless steel.

7. The method for recovering a valuable substance according to claim 1, wherein the target is a lithium ion secondary battery.

8. The method for recovering a valuable substance according to claim 7, wherein the valuable substance contains copper.

9. The method for recovering a valuable substance according to claim 7, wherein in the thermally treating, a combustion state of the lithium ion secondary battery is observed to judge whether combustion of the lithium ion secondary battery has finished or not, and terminating the thermally treating based on a judgement that combustion of the lithium ion secondary battery has finished.

10. The method for recovering a valuable substance according to claim 7, wherein the lithium ion secondary battery has a housing containing aluminum, and in the thermally treating, the aluminum of the housing of the lithium ion secondary battery is melted and a melted product is separated.

11. The method for recovering a valuable substance according to claim 1, wherein the recovering of the valuable substance includes:

pulverizing the thermally treated product, to obtain a pulverized product;

classifying the pulverized product at a classification point that is greater than or equal to 0.6 mm and less than or equal to 2.4 mm, to obtain a coarse-grained product, a size of the coarse-grained product being larger than or equal to the classification point, and a fine-grained product, a size of the fine-grained product being smaller than the classification point; and sorting the coarse-grained product using a magnet having a magnetic flux density of 0.03 tesla or higher.

12. The method for recovering a valuable substance according to claim 1, the method further comprising:

directing the flame towards the flame blocker such that the flame blocker is contacted by the flame, wherein an external surface of the flame blocker and an external surface of the target storage are separated by a space.

13. The method for recovering a valuable substance according to claim 12, wherein, in the thermally treating, the flame is directed in an approximately horizontal direction towards the flame blocker by a burner that is provided on a same horizontal plane as the flame blocker.

* * * * *